(12) United States Patent
Harbinson et al.

(10) Patent No.: US 11,019,225 B2
(45) Date of Patent: May 25, 2021

(54) DYNAMIC IMAGE CAPTURE DEVICE CONTROL SYSTEM

(71) Applicant: Bank of America Corporation, Charlotte, NC (US)

(72) Inventors: Charles Christopher Harbinson, Mooresville, NC (US); Christopher David Greth, Concord, NC (US); John Barrett Hall, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 72 days.

(21) Appl. No.: 16/250,436

(22) Filed: Jan. 17, 2019

(65) Prior Publication Data
US 2020/0236224 A1 Jul. 23, 2020

(51) Int. Cl.
*G06T 7/00* (2017.01)
*H04N 1/00* (2006.01)
(Continued)

(52) U.S. Cl.
CPC ....... *H04N 1/00039* (2013.01); *G06F 9/3004* (2013.01); *G06K 9/344* (2013.01);
(Continued)

(58) Field of Classification Search
CPC .......... H04N 1/00039; H04N 1/00973; H04N 1/00209; G06F 9/3004; G06F 3/0488; G06F 16/686; G06F 3/011; G06F 16/168; G06F 16/242; G06F 21/32; G06F 3/04842; G06F 3/005; G06F 16/435; G06F 3/0481; G06F 3/04817; G06F 3/0484; G06F 3/1454; G06F 15/16; G06F 16/116; G06F 16/434; G06F 16/93; G06F 16/9535; G06F 16/9537; G06F 21/33; G06F 21/35; G06F 21/43; G06F 21/45; G06F 21/6209; G06F 21/6218; G06F 21/64; G06F 2221/2149; G06F 3/147; G06F 15/177; G06F 16/9554; G06F 16/9558;
(Continued)

(56) References Cited

U.S. PATENT DOCUMENTS 5,461,608 A 10/1995 Yoshiyama
5,523,954 A 6/1996 Weaver et al.
(Continued)

*Primary Examiner* — Nimesh Patel
(74) *Attorney, Agent, or Firm* — Banner & Witcoff, Ltd.; Michael A. Springs

(57) ABSTRACT

Systems for controlling scanning devices and capturing image data are provided. In some examples, image data may be received by a computing platform. The image data may be received via a first network and from another computing platform in wired communication with a scanning device. In some arrangements, image quality analysis may be performed and data may be extracted from the image data. The results of the data analysis, as well as the image data and extracted data may be transmitted, via a second network different from the first network, to an associate computing device. In some examples, input received by the associate computing device may be transmitted to the computing platform indicating whether the image is approved or rejected for further processing. If the image is approved, the image data and extracted data may be transmitted, via the second network, to another device for matching and further processing functions.

22 Claims, 14 Drawing Sheets

(51) Int. Cl.
*G06F 9/30* (2018.01)
*G06K 9/34* (2006.01)

(52) U.S. Cl.
CPC ....... *G06T 7/0002* (2013.01); *H04N 1/00209* (2013.01); *H04N 1/00973* (2013.01)

(58) Field of Classification Search
CPC ...... G06F 17/175; G06F 21/629; G06F 16/50; G06F 16/40; G06F 16/58; G06F 3/1243; G06F 11/0709; G06F 11/0748; G06F 11/0766; G06F 11/0784; G06F 21/6245; G06F 16/27; G06F 16/9574; G06F 3/1446; G06T 7/0002; G06T 11/00; G06T 2207/10024; G06T 7/11; G06T 19/006; G06T 7/194; G06T 15/205; G06T 2207/10016; G06T 2207/20036; G06T 2207/30196; G06T 3/00; G06T 7/00; G06T 7/0012; G06T 7/62; G06K 9/344; G06K 7/10881; G06K 7/10811; G06K 9/00671; G06K 9/00771; G06K 2209/27; G06K 7/10554; G06K 7/10891; G06K 7/1091; G06K 7/1413; G06K 9/00456; G06K 9/00483; G06K 9/2063; G06K 9/6202; G06K 9/6247; G06K 19/14; G06K 7/015; G06K 7/10712; G06K 7/10851; G06K 7/10861; G06K 7/1098; G06K 9/627; G06K 9/20; G06K 9/00442; G06K 17/00; G06K 2209/01; G06K 9/60; G06K 9/186; G06K 9/00; G06K 9/00161; G06K 9/00288; G06K 9/00979; G06K 9/00993; G06K 9/03; G06K 9/033; G06K 9/036; G06K 9/00469; G06K 9/32; G06K 9/18; G06K 9/3258; G06K 2009/0059; G06K 9/4642; G06K 9/72; G06K 9/00335; G06K 9/2018; G06K 9/36; H04W 12/06; H04W 12/0608; H04W 12/0609; H04W 4/16; H04W 4/14; H04W 72/1242; H04W 72/1268; H04W 72/1273; H04W 72/1278; H04W 72/0406; H04W 72/10; G07F 19/20; G07F 19/205; G07F 9/023; G07F 17/3225; G07F 17/3218; G07F 17/3223; G07F 17/3227; G07F 7/04; G07F 19/202; G07F 7/08; G07F 7/10; G07F 7/12; G07F 7/0866; G07F 19/00; Y10S 902/06; Y10S 902/08; Y10S 707/944; Y10S 707/99943; Y10S 707/99952; Y10S 707/99955; G06Q 10/10; G06Q 10/02; G06Q 30/0222; G06Q 10/06311; G06Q 20/0457; G06Q 20/047; G06Q 30/0258; G06Q 30/06; G06Q 50/01; G06Q 30/0267; G06Q 20/045; G06Q 20/3278; G06Q 20/3829; G06Q 20/401; G06Q 20/405; G06Q 2220/00; G06Q 30/0643; G06Q 20/206; G06Q 20/32; G06Q 20/322; G06Q 20/351; G06Q 20/36; G06Q 10/107; G06Q 20/0855; G06Q 20/23; G06Q 20/3221; G06Q 20/3821; G06Q 20/1235; G06Q 20/18; G06Q 30/0215; G06Q 50/265; G06Q 20/042; G06Q 20/04; G06Q 40/02; G06Q 20/10; G06Q 20/22; G06Q 40/12; G06Q 40/123; G06Q 40/00; G06Q 20/0425; G06Q 10/0633; G06Q 20/108; G06Q 20/3223; G06Q 20/227; G06Q 20/3276; G06Q 20/342; G06Q 20/40; G06Q 20/403; G06Q 20/1085; G06Q 20/02; G06Q 20/4014; G06Q 20/42; G06Q 40/128; G06Q 20/325; G06Q 20/3224; G06Q 20/409; G06Q 20/3227; G06Q 20/3226; G06Q 20/3274; G06Q 20/3825; G06Q 20/4012; H04L 51/066; H04L 63/08; H04L 67/10; H04L 9/3271; H04L 2463/102; H04L 67/06; H04L 67/42; H04L 9/0866; H04L 41/22; H04L 63/0876; H04L 63/105; H04L 9/08; G07D 7/0047; G07D 11/30; G07D 7/202; G07D 7/12; G07D 7/004; G07D 11/50; G07D 7/003; G07D 7/2033

See application file for complete search history.

(56) References Cited

U.S. PATENT DOCUMENTS

| | | | |
|---|---|---|---|
| 5,590,284 A | 12/1996 | Crosetto | |
| 7,000,828 B2 | 2/2006 | Jones | |
| 7,240,843 B2 | 7/2007 | Paul et al. | |
| 2003/0188194 A1 | 10/2003 | Currie et al. | |
| 2004/0236688 A1* | 11/2004 | Bozeman | G06Q 20/4016 705/42 |
| 2007/0052979 A1* | 3/2007 | Burlingame | H04N 1/32459 358/1.1 |
| 2011/0270755 A1* | 11/2011 | Pinski | G06Q 20/042 705/44 |
| 2013/0204783 A1* | 8/2013 | Klose | G06Q 20/042 705/42 |
| 2014/0372296 A1* | 12/2014 | Tatham | G06Q 20/0425 705/40 |
| 2015/0023602 A1* | 1/2015 | Wnuk | G06F 16/583 382/190 |
| 2015/0063653 A1* | 3/2015 | Madhani | G06K 9/036 382/112 |
| 2016/0309085 A1 | 10/2016 | Ilic | |
| 2018/0061061 A1* | 3/2018 | Ozawa | G06T 7/136 |
| 2018/0109685 A1* | 4/2018 | Balamurugan | G06K 9/00483 |
| 2019/0171856 A1* | 6/2019 | Sharma | G06K 19/06103 |
| 2020/0117891 A1* | 4/2020 | Mills, Jr. | G07D 7/202 |

* cited by examiner

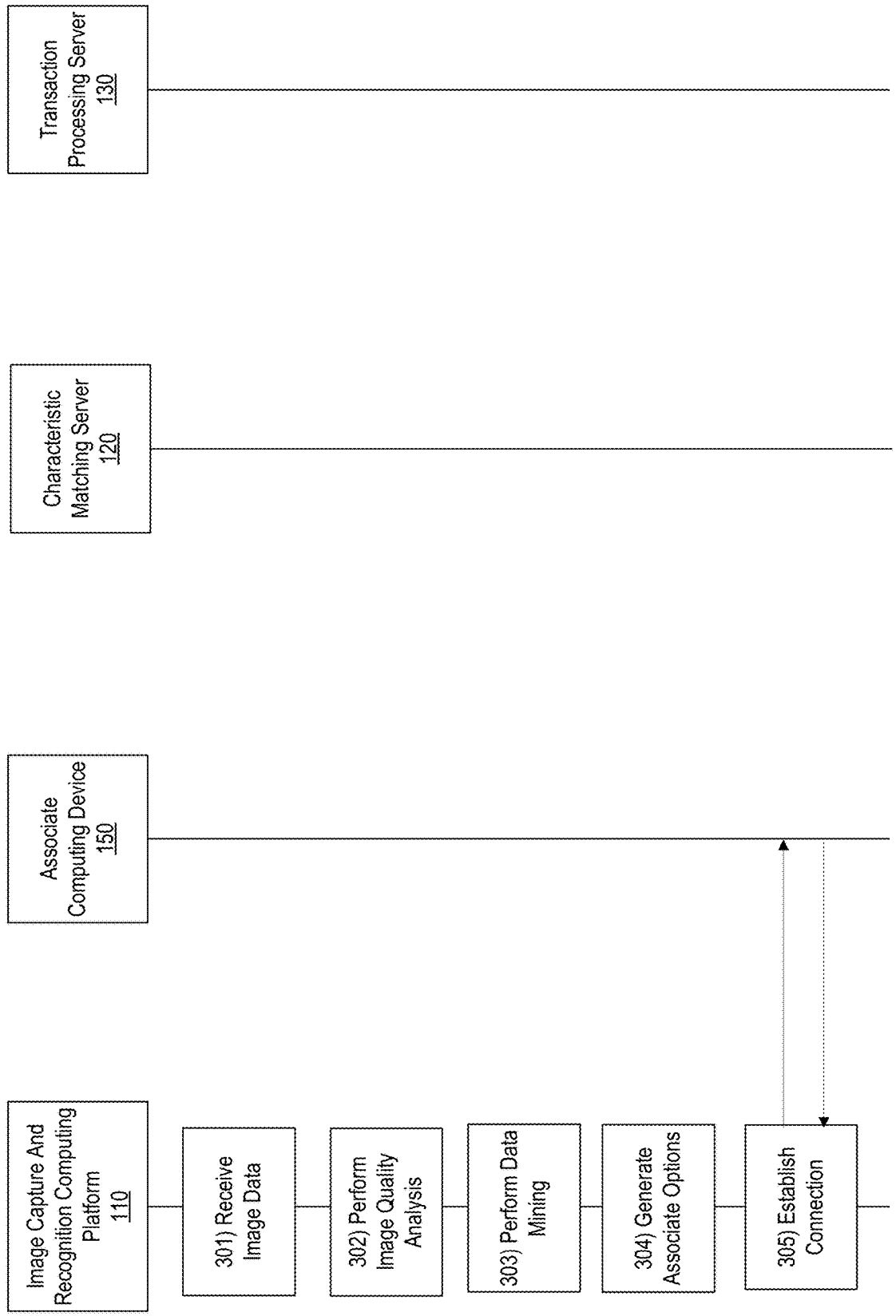

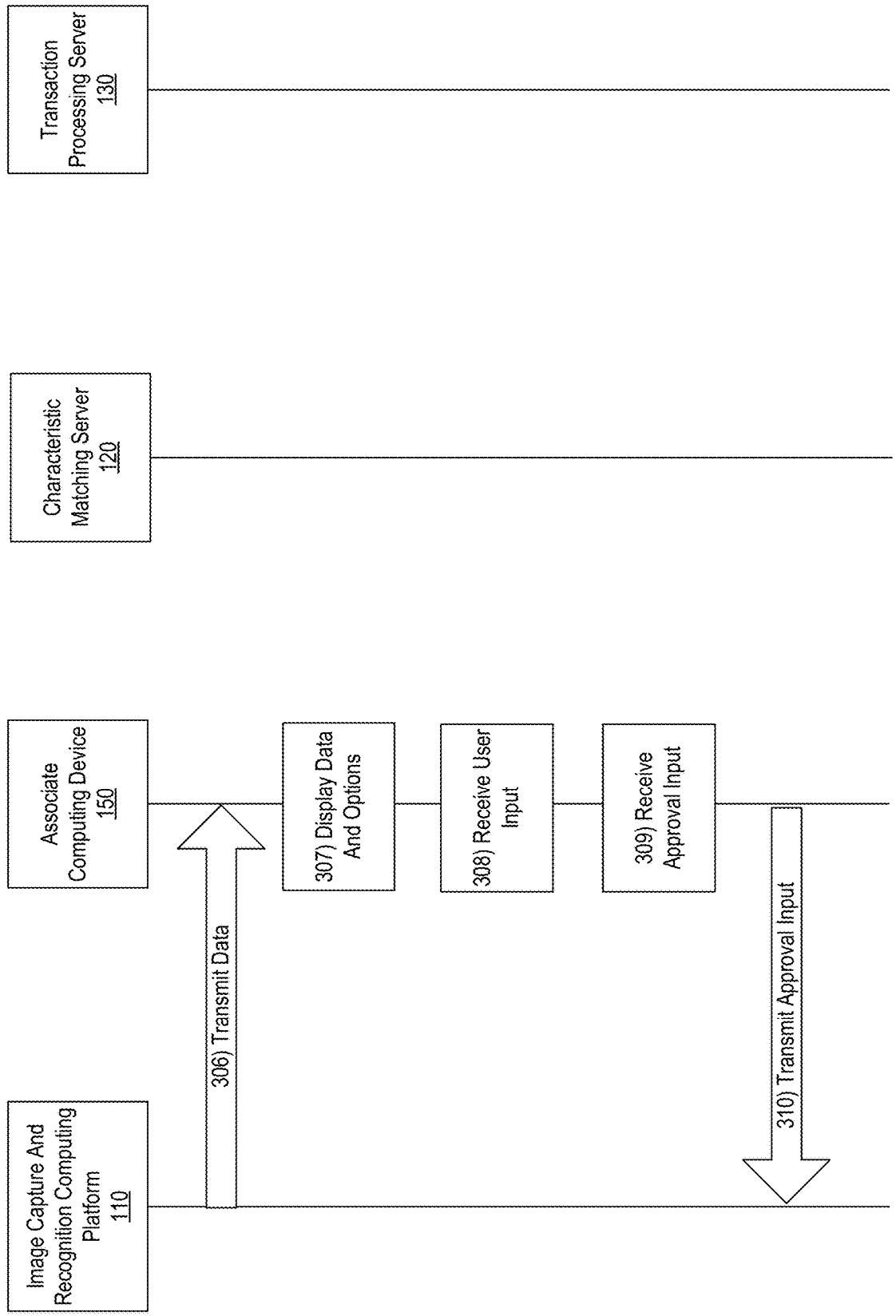

DYNAMIC IMAGE CAPTURE DEVICE CONTROL SYSTEM

BACKGROUND

Aspects of the disclosure relate to electrical computers, systems, and image capture and recognition. In particular, one or more aspects of the disclosure relate to controlling functions of a scanning device and evaluating image data captured by the scanning device.

Scanning devices are commonly used in various enterprises. In some examples, instruments or documents may be scanned in real-time to provide efficient customer service. However, in some enterprises, various regulations, security concerns, and the like, may prevent the scanning device from being connected to a same network as, for example, an associate computing device. Accordingly, capturing the image data from the scanned instrument or document and analyzing the image data can be inefficient when devices are not permitted to communicate via a single network.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with controlling functionality of a scanning device and capturing and analyzing image data.

In some examples, image data may be received by a computing platform. The image data may be received via a first network and from another computing platform in wired communication with a scanning device. In some arrangements, image quality analysis may be performed and data may be extracted from the image data. The results of the data analysis, as well as the image data and extracted data may be transmitted, via a second network different from the first network, to an associate computing device. In some examples, input received by the associate computing device may be transmitted to the computing platform indicating whether the image is approved or rejected for further processing. If the image is approved, the image data and extracted data may be transmitted, via the second network, to another device for matching and further processing functions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3D depict another illustrative event sequence for implementing image capture and recognition functions in accordance with one or more aspects described herein;

DETAILED DESCRIPTION

Figure 1A:
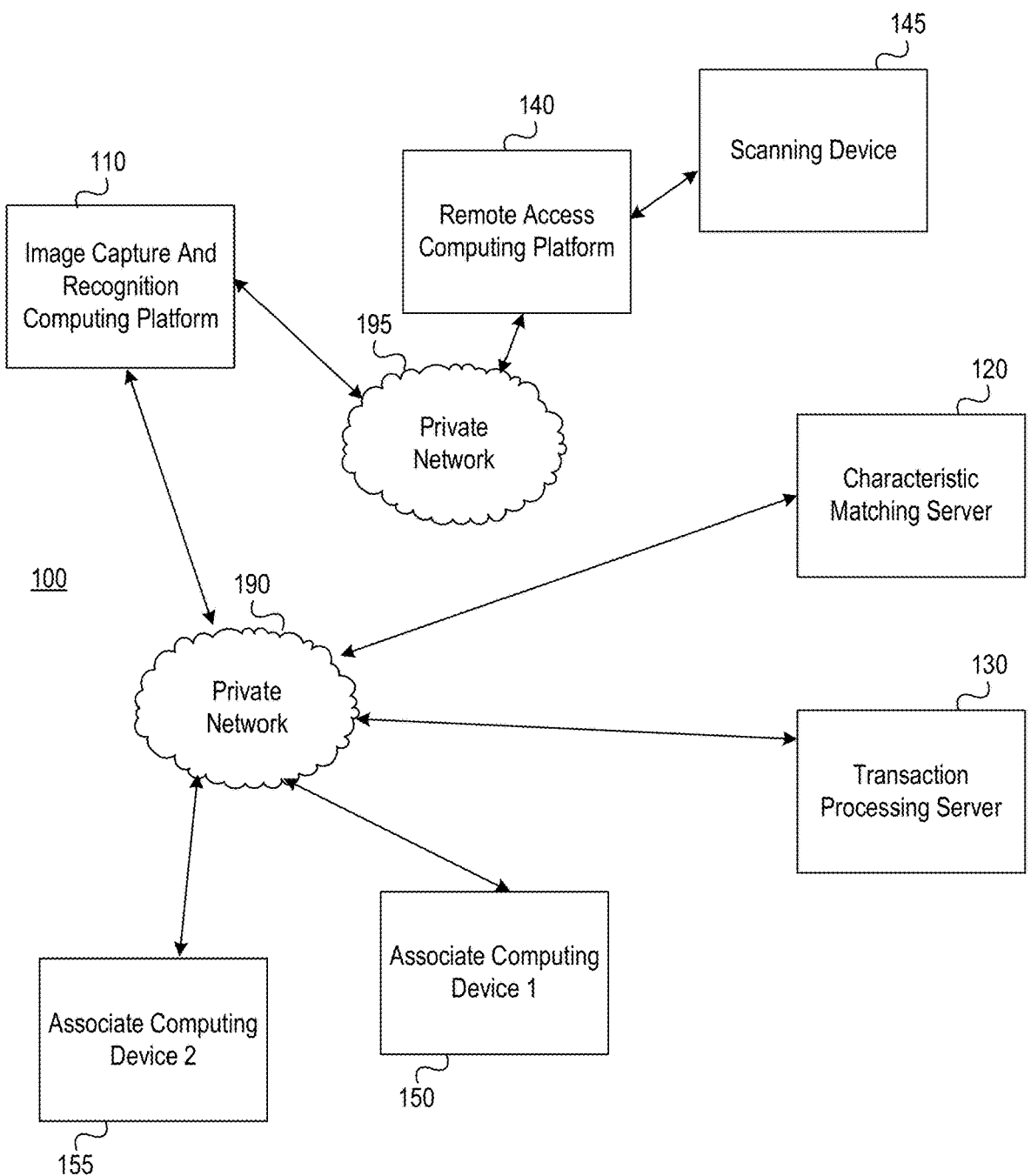
FIGS. 1A-1C depict an illustrative computing environment for implementing image capture and recognition functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to control of scanning devices and image capture and recognition.

As mentioned above, scanning devices are common in enterprises in most industries. Further, customer service focused industries are often looking for ways to improve efficiency when dealing with customers. However, maintaining information security is also an important consideration. Often times, due to security concerns, regulations, or the like, certain devices might not be connected to same network as other devices necessary to complete scanning functions, processing functions, and the like. Accordingly, when scanning a document is part of providing customer service, it would be advantageous to efficiently activate a scanning device, scan documents in real-time to capture image data which can then be analyzed to provide an efficient transaction processing experience and perform these functions across multiple networks.

Accordingly, aspects described herein are directed to real-time activation of scanning devices, as well as image capture and recognition across multiple networks. In some examples, a device, such as an associate computing device, may request initiation of a scanning operation. In some examples, the associate device may be prevented from communicating directly with the scanning device because the associate computing device and scanning devices might be connected to different networks. Accordingly, a request to initiate scanning may be transmitted from the associate computing device to a computing platform that may be in communication, via a first network, with a device controlling the scanning device. The computing platform may cause the scanning device to activate and initiate scanning of a document.

After the document has been scanned, image data from the scanned document (e.g., magnetic image character recognition (MICR) line data, other additional data, or the like) and scanning process may be transmitted, via the first network, to the computing platform. The computer platform may perform image quality analysis, data extraction, and the like. The image data and extracted data may be transmitted to the associate computing device via a second network for approval. If approval is received, the image data and extracted data may be transmitted, via the second network, to other devices for further processing and final transaction processing.

These and various other arrangements will be discussed more fully below.

Figure 1B:
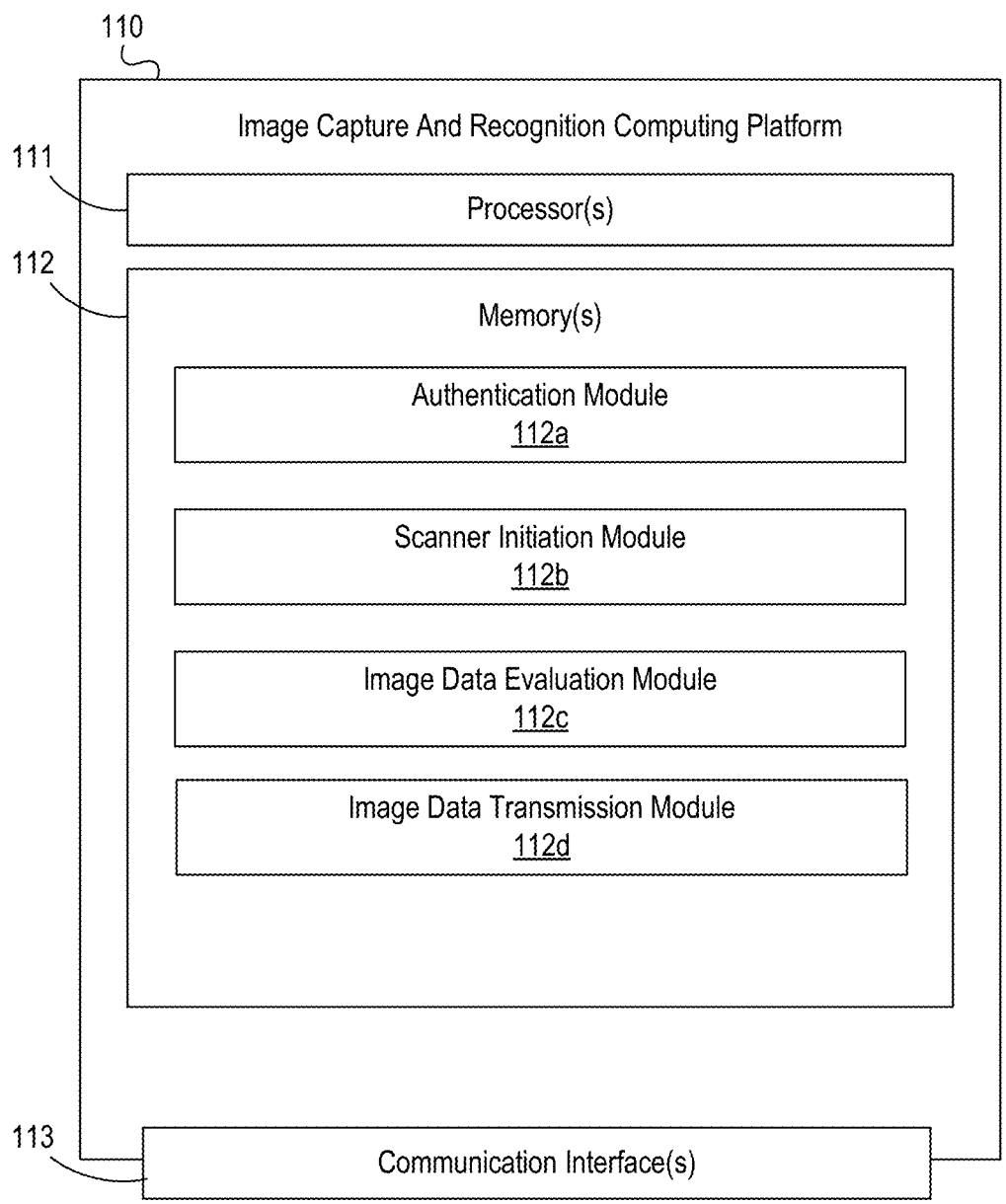
Figure 1C:
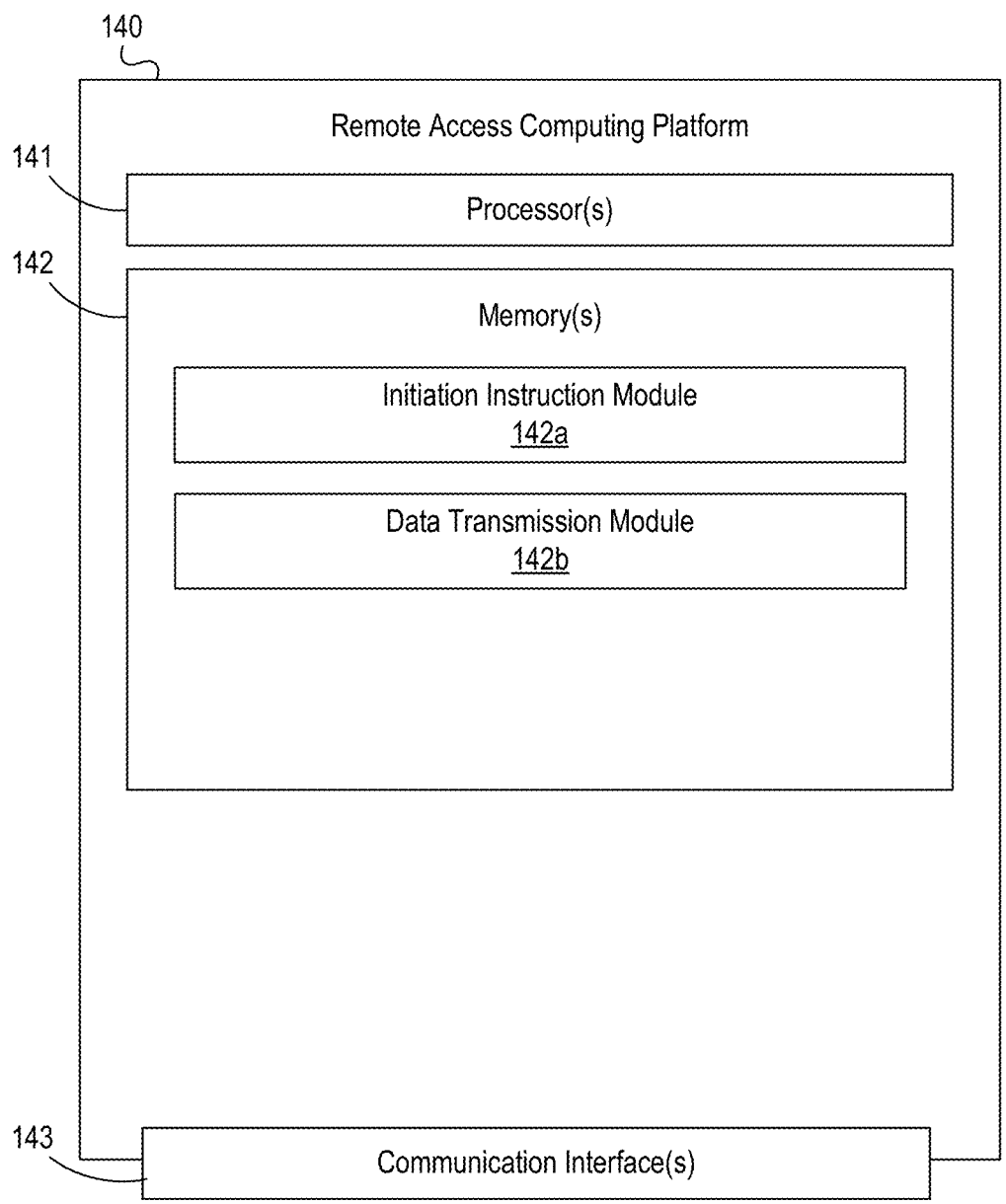

FIGS. 1A-1C depict an illustrative computing environment for implementing and using a system for multi-network scanning and image capture and recognition in accordance with one or more aspects described herein. Referring to FIG. 1A, computing environment 100 may include one or more computing devices and/or other computing systems. For example, computing environment 100 may include image capture and recognition computing platform 110, characteristic matching server 120, transaction processing server 130, remote access computing platform 140, scanning device 145, associate computing device 1 150 and associate computing device 2 155.

Image capture and recognition computing platform 110 may be configured to provide intelligent, dynamic control of image capture devices, as well as evaluation of images and image data, authentication processes, and the like. For instance, image capture and recognition computing platform 110 may receive, from, for example, an associate computing device, such as associate computing device 150, 155, a request for an authentication token for each transaction being requested for processing by associate computing device 150, 155. The image capture and recognition computing platform 110 may forward a token to the associate computing device 150, 155. In response, the associate computing device 150, 155 may request initiation of scanning function. In some examples, the request for initiation of the scanning function may be performed using an application executing on the associate computing device 150, 155 that corresponds to an application executing on the image capture and recognition computing platform 110.

In response to receiving the request to initiate a scanning function, the image capture and recognition computing platform 110 may transmit a signal or command to remote access computing platform 140. The signal or command may include an instruction to initiate or activate functionality of a scanning device, such as scanning device 145. In some examples, the scanning device 145 may be a driverless device that communicates only with the remote access computing platform 140 (e.g., via a wired connection). Accordingly, the remote access computing platform 140 may be in communication with one or more other devices or systems (e.g., image capture and recognition computing platform 110) via a network different from the network providing communication between, for instance, associate computing device 150, 155 and image capture and recognition computing platform 110.

One or more instruments, documents or the like, may be scanned by the scanning device and image data may be transmitted to or captured by the remote access computing platform 140. The remote access computing platform 140 may transmit image data to the image capture and recognition computing platform 110. The image capture and recognition computing platform 110 may evaluate the received image data to extract data (e.g., via optical character recognition) related to a payer, a payee, a date, a signature, and the like. Further, magnetic image character recognition (MICR) line data (e.g., account number, routing number, check number or the like) may be read by the image capture and recognition computing platform 110. In some examples, image capture and recognition computing platform 110 may evaluate the instrument or document scanned to determine a likelihood of validity of the instrument or document (e.g., a validity score), authenticate the document, and the like.

In some examples, the image capture and recognition computing platform 110 may transmit MICR line data, extracted data, image data, and the like, to associate computing device 150, 155. In some examples, the application executing on the image capture and recognition computing platform 110 that received the request to initiate scanning may be used to transmit the MICR line data, extracted data, image data, and the like, to the associate computing device 150, 155.

In some examples associate computing device 150, 155 may evaluate the received data to determine whether any documents need to be rescanned, are missing data, or the like. For any items not needing additional action (e.g., items moving forward to processing), the associate computing device 150, 155 may generate an item identifier for each item that will be moved forward for further processing. The item identifiers may be transmitted to the image capture and recognition computing platform 110. The image data, extracted data, MICR line data, item identifiers and the like, may be transmitted to characteristic matching server 120 to determine whether the instrument or document should continue to further processing. If so, the transaction processing server 130 may further process the instrument, document, or the like.

As discussed above, remote access computing platform 140 may be configured to communicate with scanning device 145. In some examples, the remote access computing platform 140 may be connected to the scanning device 145 via a USB cable. Accordingly, the remote access computing platform 140 may communicate with image capture and recognition computing platform 110 and may transmit data captured by the scanning device 145 to the image capture and recognition computing platform 110.

Characteristic matching server 120 may be a server configured to evaluate data (e.g., image data, MICR line data, and the like) to determine whether it matches expected data (e.g., account number, payer, payee, or the like). If not, additional evaluation of the instrument may be performed. If so, an instruction or command may be transmitted to further process the instrument (e.g., complete processing a transaction associated with the instrument). In some examples, the instruction may be transmitted to transaction processing server 130.

Transaction processing server 130 may be a server configured to receive data from, for example, the associate computing device 150, 155 (e.g., transaction data, user data, account data, image data, and the like) and may compare the data with data received by the characteristic matching server. If the data matches, the transaction processing server 130 may process the requested transaction (e.g., deposit a scanned check, or the like).

Associate computing device 1 150 and associate computing device 2 155 may be computing devices in communication with a network of an entity or enterprise. In some examples, the associate computing devices 150, 155 may special purpose computers configured to perform particular functions for an associate facilitating processing of the instrument or document. In some examples, the associate computing devices 150, 155 may be a desktop computer, laptop computer, tablet computer, or the like, configured to facilitate processing of the instrument or document.

In one or more arrangements, characteristic matching server 120, transaction processing server 130, associate computing device 1 150 and/or associate computing device 2 155 may be any type of computing device or combination of devices configured to perform the particular functions described herein. For example, characteristic matching server 120, transaction processing server 130, associate computing device 1 150 and/or associate computing device 2 155 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of characteristic matching server 120, transaction processing server 130, associate computing device 1 150 and/or associate computing device 2 155 may be special-purpose computing devices configured to perform specific functions.

Computing environment 100 also may include one or more computing platforms. For example, and as noted above, computing environment 100 may include image capture and recognition computing platform 110 and remote access computing platform 140. As illustrated in greater detail below, image capture and recognition computing platform 110 and remote access computing platform 140 may include one or more computing devices configured to perform one or more of the functions described herein. For example, image capture and recognition computing platform 110 and remote access computing platform 140 may include one or more computers (e.g., laptop computers, desktop computers, servers, server blades, or the like).

As mentioned above, computing environment 100 also may include one or more networks, which may interconnect one or more of image capture and recognition computing platform 110, remote access computing platform 140, characteristic matching server 120, transaction processing server 130, associate computing device 150, associate computing device 155, and the like. In some arrangements, some devices may be in communication with a first network, while other devices may be in communication with a second network, different from the first network. In some examples, one or more devices in communication with one network might not be in communication with the other network (e.g., communication may be prevented).

For example, computing environment 100 may include a first private network 190 and a second private network 195. Private network 190 and/or private network 195 may include one or more sub-networks (e.g., Local Area Networks (LANs), Wide Area Networks (WANs), or the like). Private network 190 and private network 195 may each be associated with a particular organization (e.g., a corporation, financial institution, educational institution, governmental institution, or the like) and may interconnect one or more computing devices associated with the organization. However, in some examples, one or more devices may communicate via the first private network 190, while other devices may communicate via the second private network 195.

For example, remote access computing platform may be connected to second private network 195 while characteristic matching server 120, transaction processing server 130, associate computing device 150, and associate computing device 155 may be connected to first private network 190. In some examples, one or more devices may be connected to both networks. For instance, image capture and recognition computing platform 110 may be connected to first private network 190 and second private network 195.

The devices and systems shown in FIG. 1A may be associated with an organization (e.g., a financial institution), and private network 190 and private network 195 may be associated with and/or operated by the organization, and may include one or more networks (e.g., LANs, WANs, virtual private networks (VPNs), or the like) that interconnect the devices shown and one or more other computing devices and/or computer systems that are used by, operated by, and/or otherwise associated with the organization.

Referring to FIG. 1B, image capture and recognition computing platform 110 may include one or more processors 111, memory 112, and communication interface 113. A data bus may interconnect processor(s) 111, memory 112, and communication interface 113. Communication interface 113 may be a network interface configured to support communication between image capture and recognition computing platform 210 and one or more networks (e.g., private network 190, private network 195, or the like). Memory 112 may include one or more program modules having instructions that when executed by processor(s) 111 cause image capture and recognition computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of image capture and recognition computing platform 110 and/or by different computing devices that may form and/or otherwise make up image capture and recognition computing platform 110.

For example, memory 112 may have, store and/or include an authentication module 112a. Authentication module 112a may store instructions and/or data that may cause or enable the image capture and recognition computing platform 110 to receive a request for an authentication token, generate a token, transmit a token to a requesting device (e.g., associate computing device 150, associate computing device 155), authenticate tokens, and the like. In some examples, each transaction (e.g., each instrument or cluster of instruments scanned or requested for scanning) may include a requested authentication token that may be used to authenticate the transaction through processing.

Memory 112 may further have, store and/or include scanner initiation module 112b. Scanner initiation module 112b may store instructions and/or data that may cause or enable the image capture and recognition computing platform 110 to receive, for example, from associate computing device 150, a request to execute an application on the image capture and recognition computing platform 110. In some examples, executing the application may enable or activate one or more functions described herein. Upon receiving the request to execute the application, the application may be executed and an instruction to activate a scanning device and initiate a scanning operation may be generated. In some examples, the image capture and recognition computing platform 110 might not be able to communicate directly with the scanning device. Instead, the generated instruction may be transmitted to a remote access computing platform 140, that may be in communication with the scanning device.

Memory 112 may further have, store and/or include image data evaluation module 112c. Image data evaluation module 112c may store instructions and/or data that may cause or enable the image capture and recognition computing platform 110 to receive image data (e.g., from the scanning device 145 and via the remote access computing platform 140), evaluate the image data to determine validity of the instrument or document scanned, and extract data (e.g., via OCR, MICR line data, or the like) from the scanned instrument or document.

Memory 112 may further have, store and/or include image data transmission module 112d. Image data transmission module 112d may store instructions and/or data that may cause or enable the image capture and recognition computing platform 110 to transmit and receive image data, extracted data, and the like. For instance, the image data transmission module 112d may transmit and receive data from associate computing device 150, associate computing device 155, characteristic matching server 120, transaction processing server 130, or the like.

Referring to FIG. 1C, remote access computing platform 140 may include one or more processors 141, memory 142, and communication interface 143. A data bus may interconnect processor(s) 141, memory 142, and communication interface 143. Communication interface 143 may be a network interface configured to support communication between remote access computing platform 140 and one or more networks (e.g., private network 195, or the like). Memory 142 may include one or more program modules having instructions that when executed by processor(s) 141 cause remote access computing platform 140 to perform one or more functions described herein and/or one or more databases that may store and/or otherwise maintain information which may be used by such program modules and/or processor(s) 141. In some instances, the one or more program modules and/or databases may be stored by and/or maintained in different memory units of remote access computing platform 140 and/or by different computing devices that may form and/or otherwise make up remote access computing platform 140.

For example, memory 142 may have, store and/or include an initiation instruction module 142a. Initiation instruction module 142a may store instructions and/or data that may cause or enable the remote access computing platform 140 to receive a signal, command or instruction (e.g., from image capture and recognition computing platform 110) to activate a scanning device and/or initiate a scanning function and execute the signal, command or instruction. Accordingly, initiation instruction module 142a may communicate with scanning device 145 to activate or enable the device and initiate a scanning process.

Memory 142 may further have, store and/or include data transmission module 142b. Data transmission module 142b may store instructions and/or data that may cause or enable the remote access computing platform 140 to receive image data from the scanning device 145 and transmit the image data to, for example, image capture and recognition computing platform 110.

Figure 2A:
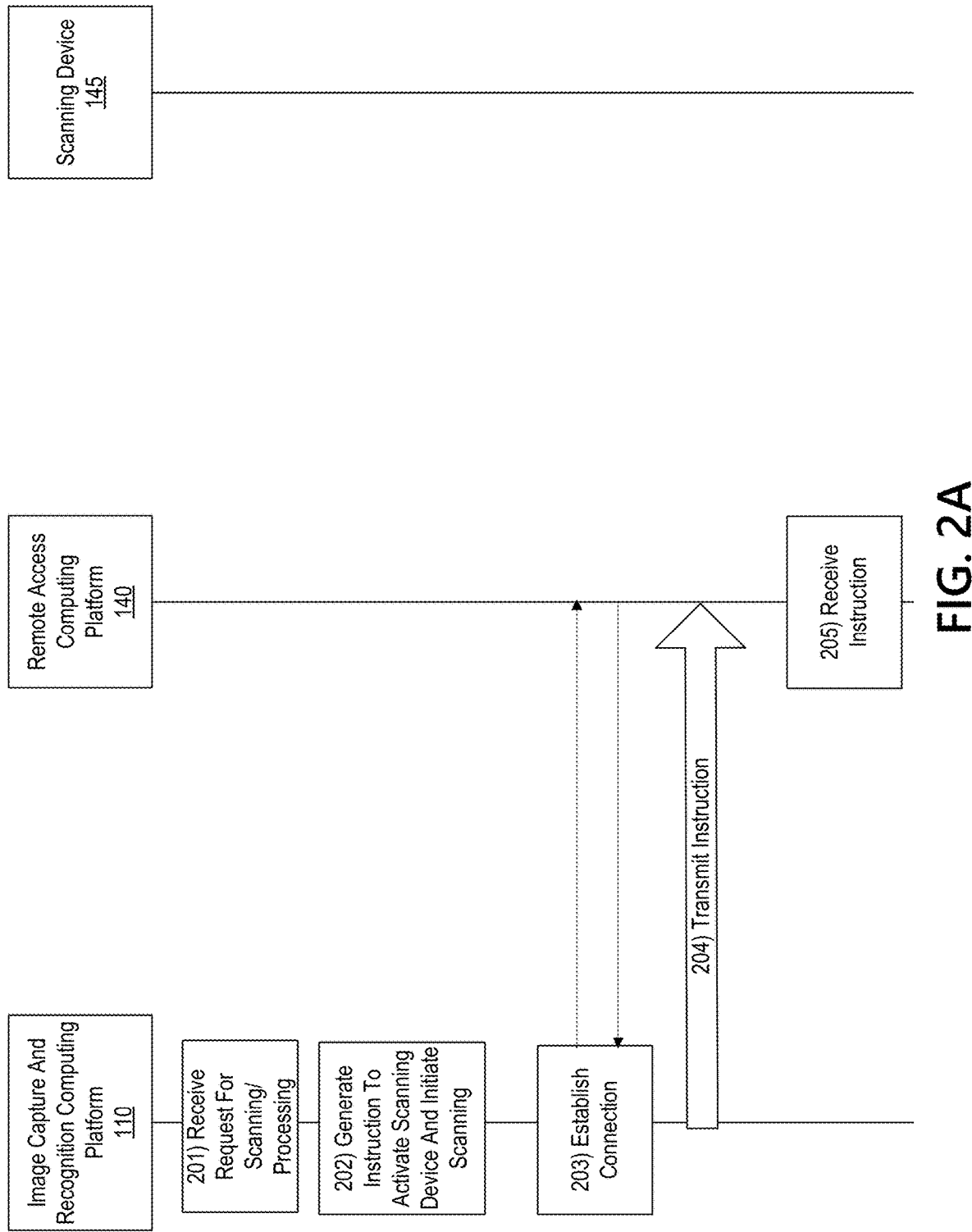
FIGS. 2A-2C depict an illustrative event sequence for implementing image capture and recognition functions in accordance with one or more aspects described herein.
Figure 2B:
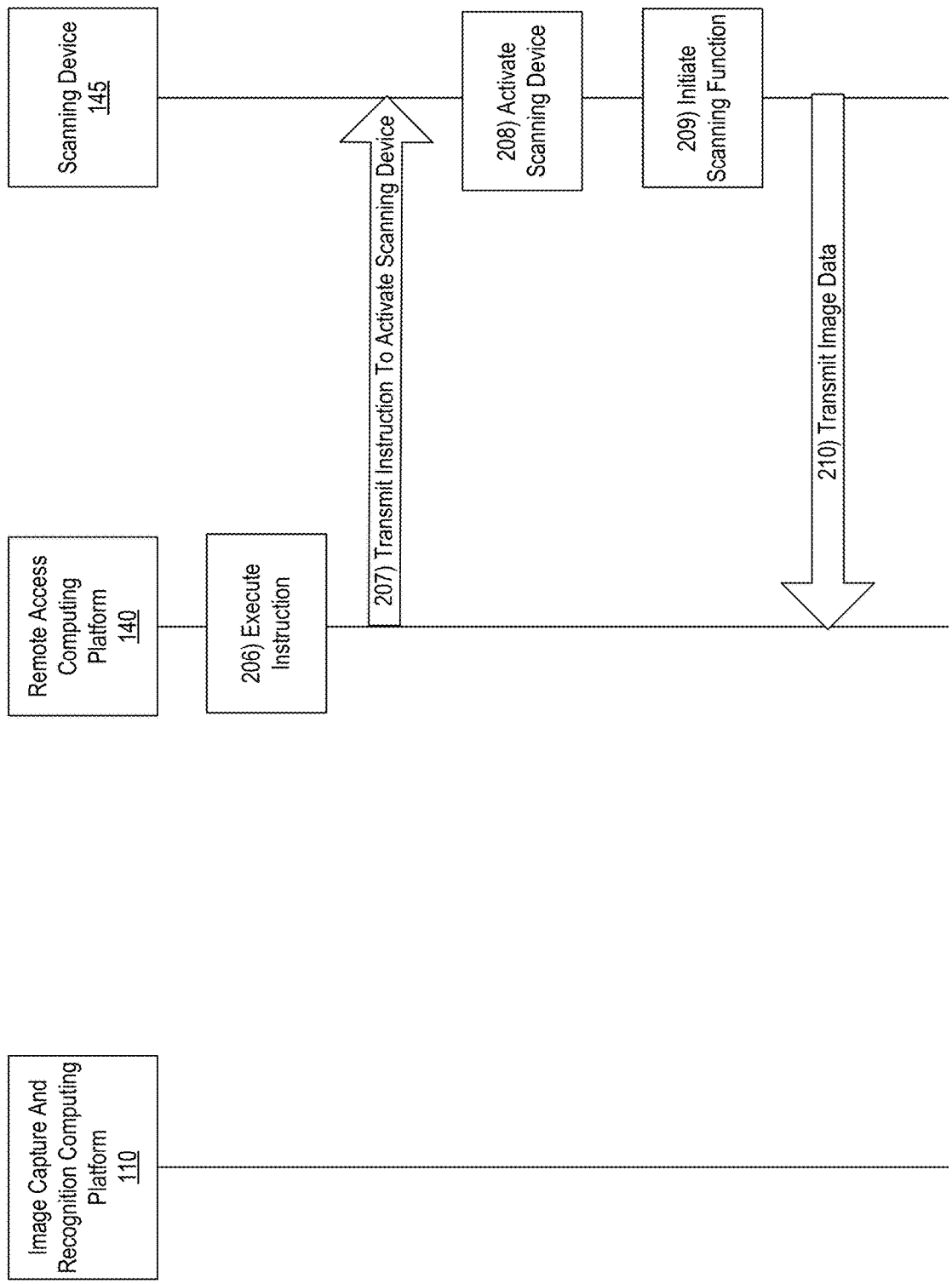
Figure 2C:
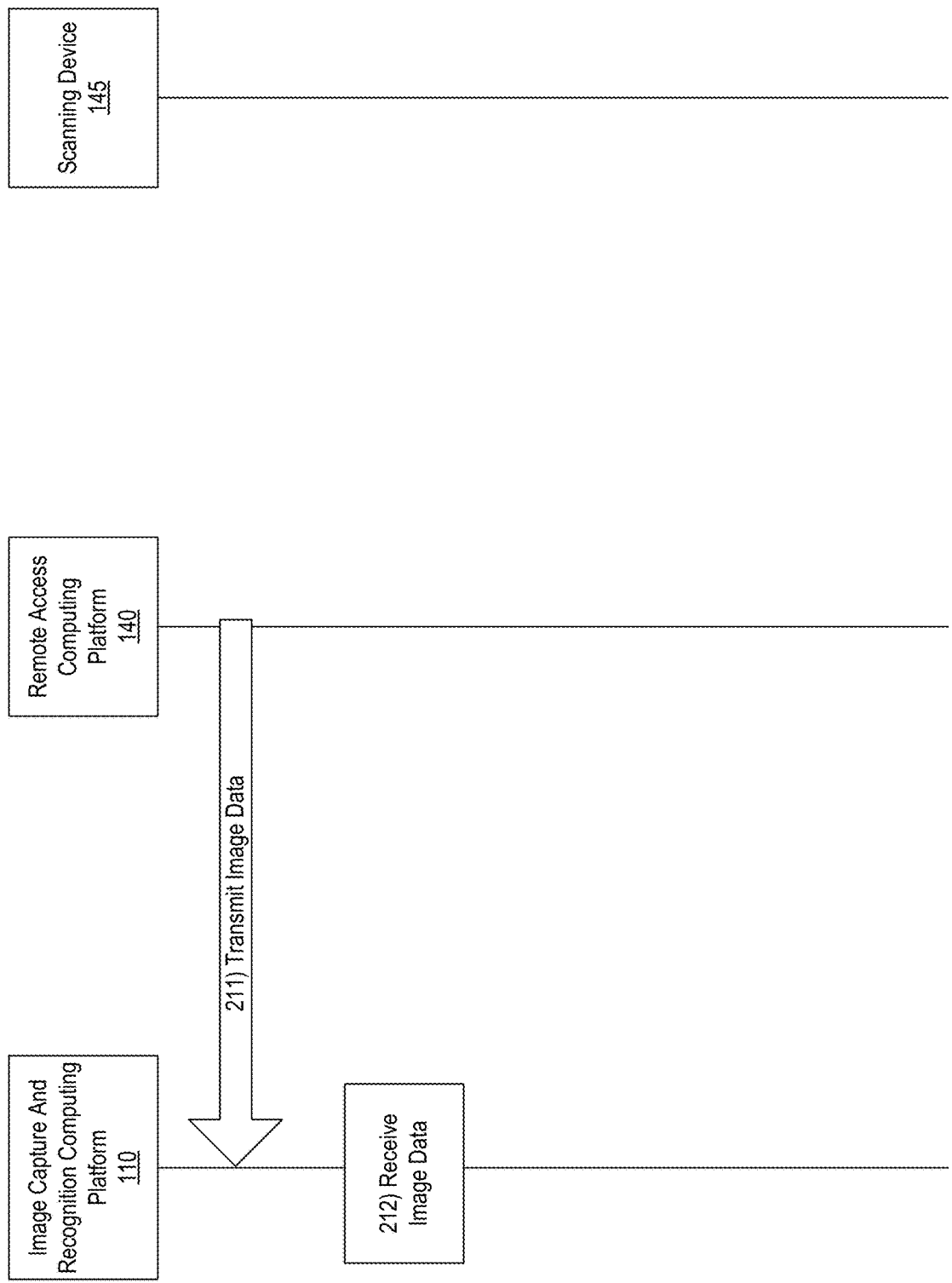

FIGS. 2A-2C depict one example illustrative event sequence for implementing and using image capture and recognition control functions in accordance with one or more aspects described herein. The events shown in the illustrative event sequence are merely one example sequence and additional events may be added, or events may be omitted, without departing from the invention.

Referring to FIG. 2A, at step 201, a request to initiate processing of a transaction and/or scanning of an instrument or document may be received. In some examples, the request may be received from an associate computing device 150 by the image capture and recognition computing platform 110. In some examples, the request may be input into an application executing on the associate computing device 150 and transmitted, via the application, to the image capture and recognition computing platform 110 having the same or corresponding application executing thereon. The request may, in some examples, include a request for an authentication token, as is discussed more fully herein.

At step 202, the received request to process a transaction or initiate scanning of an instrument or document may be processed and an instruction, command or signal to activate a scanning device and/or initiate scanning may be generated. The signal, command or instruction may include identification of a particular scanning device (e.g., by a unique identifier of the scanning device, remote access computing platform associated therewith, or the like) to be activated or at which the scanning should be initiated.

At step 203, a connection may be established between the image capture and recognition computing platform 110 and the remote access computing platform 140. As discussed above, in some examples, the device from which the request for transaction processing or scanning is received might not be connected to a same network as the remote access computing platform 140 in communication with scanning device 145. Accordingly, the associate computing device 150 requesting transaction processing or scanning initiation may communicate via a separate network (e.g., a second network) with the image capture and recognition computing platform 110, that may in turn communicate via the first network with remote access computing platform 140.

The connection established between the image capture and recognition computing platform 110 and the remote access computing platform 140 may be a first wireless connection. Upon establishing the first wireless connection, a communication session may be initiated between the image capture and recognition computing platform 110 and the remote access computing platform 140.

At step 204, the generated instruction to activate the scanning device 145 and/or initiate scanning may be transmitted from the image capture and recognition computing platform 110 to the remote access computing platform 140. The generated instruction may be transmitted during the communication session initiated upon establishing the first wireless connection. At step 205, the instruction may be received by the remote access computing platform 140.

With reference to FIG. 2B, at step 206, the received instruction may be executed by the remote access computing platform 140. Executing the instruction may include transmitting an instruction to the scanning device 145 at step 207. The instruction may cause the scanning device 145 to activate or enable (e.g., in some examples, power on) in step 208 and initiate scanning of an instrument or document in step 209. For instance, in some examples, scanning device 145 may be a follower node in which the remote access computing platform 140 has unidirectional control over the device 145. Accordingly, network access to the scanning device 145 is controlled by the remote access computing platform 140. In some examples, scanning the instrument or document by the scanning device 145 may include physically moving the instrument or document through the device 145 to capture image data.

At step 210, image data from the scanned document may be transmitted to the remote access computing platform 140.

With reference to FIG. 2C, at step 211, the image data may be transmitted to the image capture and recognition computing platform 110 (e.g., via the first wireless connection and first network) and, at step 212, the image data may be received by the image capture and recognition computing platform 110.

FIGS. 3A-3D depict another example illustrative event sequence for implementing and using image capture and recognition control functions in accordance with one or more aspects described herein. The events shown in the illustrative event sequence are merely one example sequence and additional events may be added, or events may be omitted, without departing from the invention.

Referring to FIG. 3A, at step 301, image data may be received. For instance, step 301 may correspond to step 212 in FIG. 2C and may occur after the processes described with respect to FIGS. 2A-2C. In some examples, the received image data may include additional data associated with the scanning instrument or documents. The image data may be received via a first network.

At step 302, image quality analysis may be performed on the image data. For instance, the image capture and recognition computing platform 110 may evaluate the received image data to detect whether the image is too light, too dark, whether instrument had a physical issue such as bent corners, a tear, or the like.

At step 303, data mining may be performed on the image data and/or additional data. For instance, optical character recognition may be used to extract data from the image data, such as payee, check number, date, whether the instrument was signed, whether the instrument was endorsed, and the like. In some examples, data mining may include reading MICR line data to identify a check number, routing number, account number, or the like.

At step 304, a user interface including one or more associate options may be generated. For instance, the image capture and recognition computing platform 110 may generate a user interface including one or more options for additional information that may be provided to an associate computing device 150. In some examples, options may include viewing an image of the instrument or document, rescanning the image or document, removing the image or document from further processing, or the like.

At step 305, a connection may be established between the image capture and recognition computing platform 110 and the associate computing device 150. As discussed herein, some devices described herein may be connected via a first network, while other devices may be connected via a second network. Accordingly, the connection establishing in step 305 may be via a second network, different from the first network used to connect the image capture and recognition computing platform 110 to the remote access computing platform 140 in step 203 or to receive the image data.

The connection established between the image capture and recognition computing platform 110 and the associate computing device 150 may be a first wireless connection. Upon establishing the first wireless connection, a communication session may be initiated between the image capture and recognition computing platform 110 and the associate computing device 150.

With reference to FIG. 3B, at step 306, the image data and/or extracted data may be transmitted to the associate computing device 150. In some examples, the image data and/or extracted data may be transmitted during the communication session initiated upon establishing the first wireless connection. In some arrangements, the generated user interface including options may be transmitted with the image data and/or extracted data. In some examples, the data may be transmitted by uploading the data to an application executing on the image capture and recognition computing platform 110 that is in communication with a corresponding application executing on the associate computing device 150 (e.g., causing the data, user interface, and the like to display on a display of the associate computing device 150).

At step 307, the transmitted data and options may be received by the associate computing device 150 and displayed on a display of the associate computing device. At step 308, the associate computing device 150 may receive user input selecting one or more options from the generated options on the displayed user interface. Selection of one or more options may cause one or more other user interfaces to display (e.g., providing an image of the instrument, requesting confirmation of instructions, and the like). In some examples, step 308 may be optional and user input selecting one or more options might not be received.

At step 309, approval input may be received by the associate computing device 150. For instance, after receiving the image data, extracted data, and the like, an associate associated with the associate computing device 150 may review the data for accuracy, and the like. After reviewing the data, if no errors or issues are found, the associate may provide user input indicating that the image data (e.g., the scanned instrument or document) is approved for transaction processing.

At step 310, the approval input may be transmitted from the associate computing device 150 to the image capture and recognition computing platform 110. In some examples, the approval input may be transmitted during the communication session initiated upon establishing the first wireless connection.

Figure 3C:
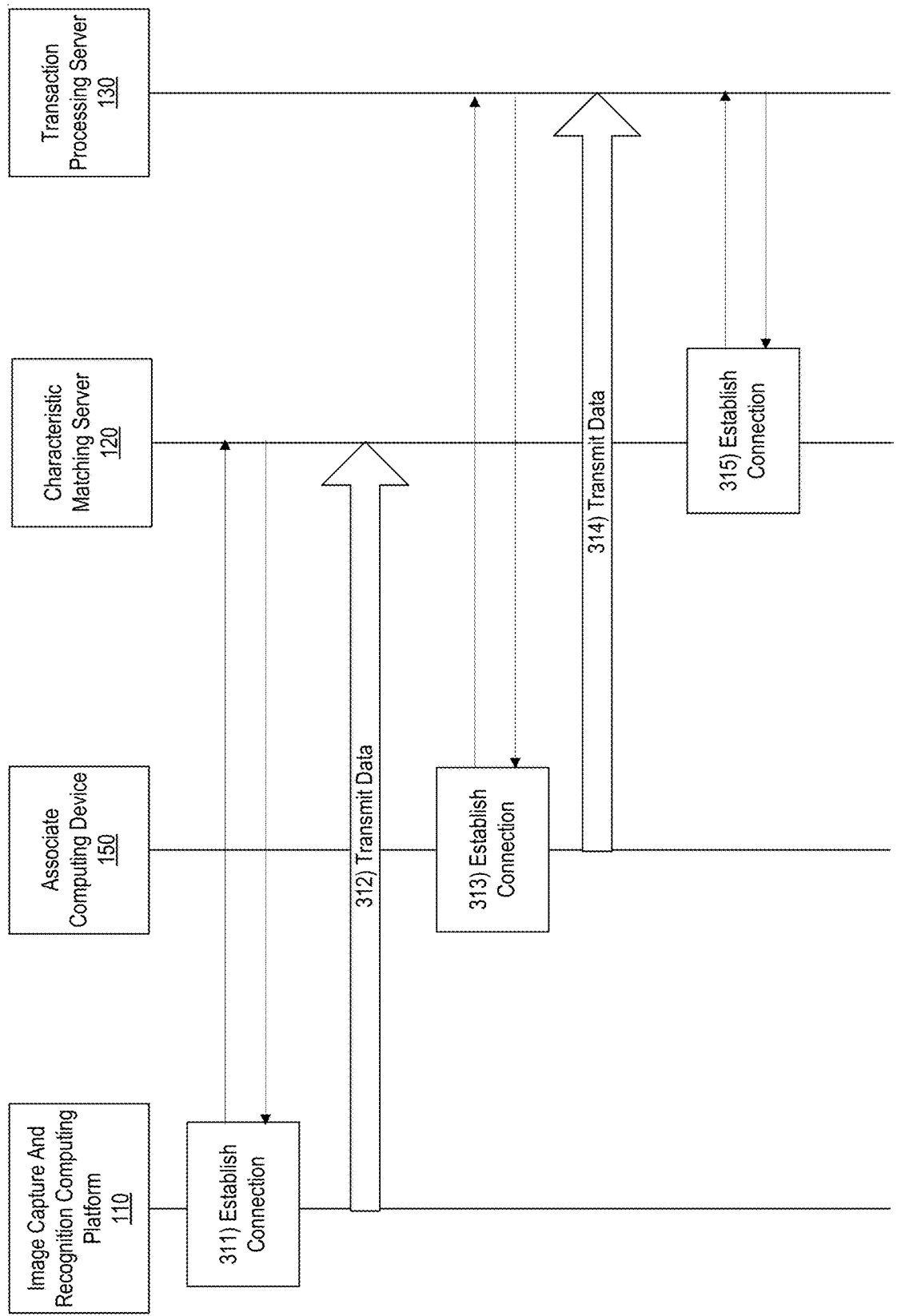

With reference to FIG. 3C, at step 311, a connection may be established between the image capture and recognition computing platform 110 and characteristic matching server 120. For instance, a second wireless connection may be established between the image capture and recognition computing platform 110 and the characteristics matching server 120. Upon establishing the second wireless connection, a communication session may be initiated between the characteristic matching server 120 and the image capture and recognition computing platform 110.

At step 312, data may be transmitted from the image capture and recognition computing platform 110 to the characteristic matching server 120. In some examples, the data may be transmitted during the communication session initiated upon establishing the second wireless connection. The transmitted data may include image data, extracted data, approval data, and the like.

At step 313, a connection may be established between the associate computing device 150 and the transaction processing server 130. For instance, a third wireless connection may be established between the associate computing device 150 and the transaction processing server 130. Upon establishing the third wireless connection, a communication session may be initiated between the transaction processing server 130 and the associate computing device 150.

At step 314, data may be transmitted from the associate computing device 150 to the transaction processing server 130. In some examples, the data may be transmitted during the communication session initiated upon establishing the third wireless connection. The transmitted data may include image data, extracted data, approval data, and the like. Further, the data may include data captured by the associate computing device 150 via associate input (e.g., data related to the transaction, user, and the like).

At step 315, a connection may be established between the transaction processing server 130 and characteristic matching server 120. For instance, a fourth wireless connection may be established between the transaction processing server 130 and the characteristic matching server 120. Upon establishing the fourth wireless connection, a communication session may be initiated between the characteristic matching server 120 and the transaction processing server 130.

Figure 3D:
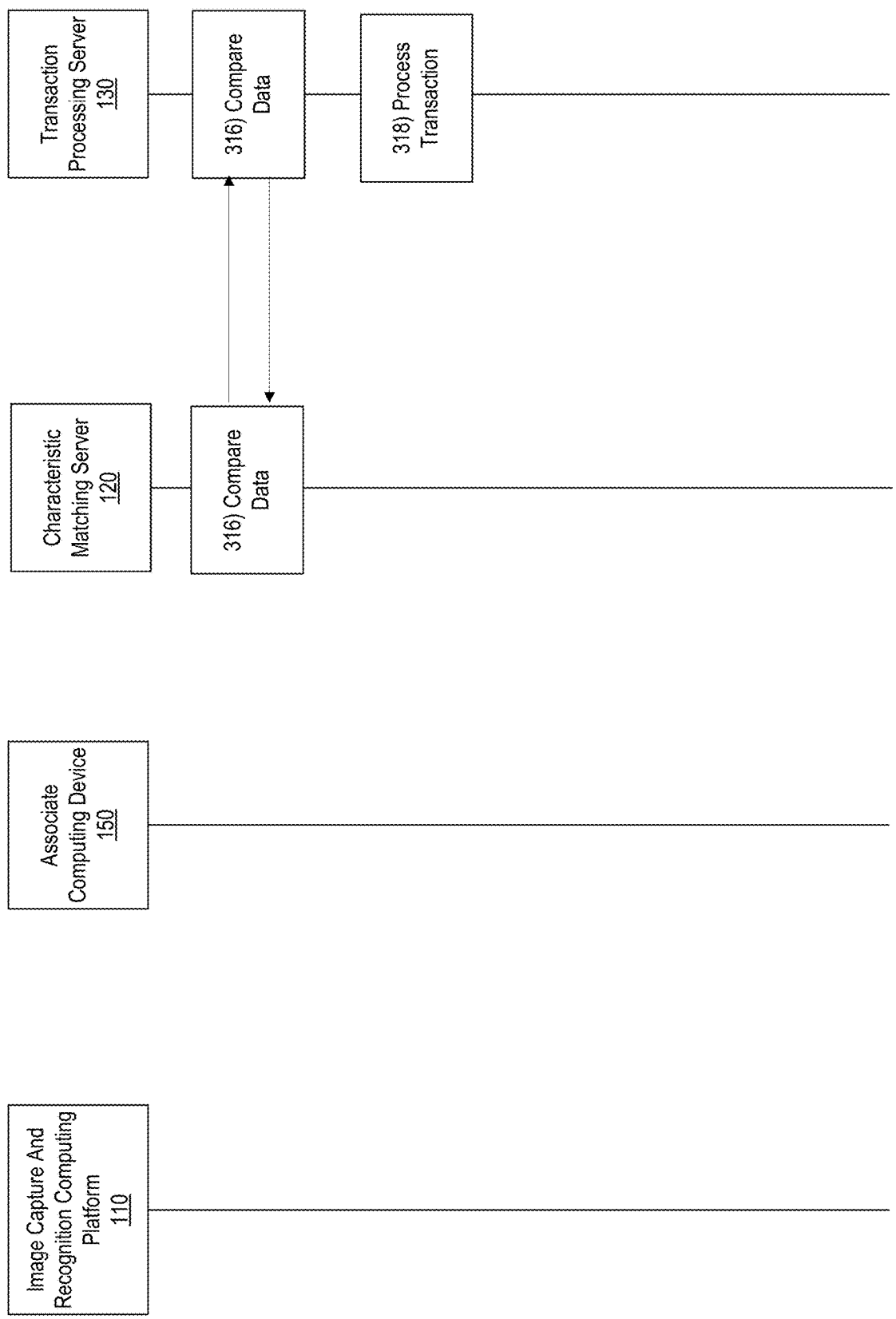

With reference to FIG. 3D, at step 316, the data received by the transaction processing server 130 from the associate computing device 150 may be compared to the data received by the characteristic matching server 120 from the image capture and recognition computing platform 110. The data may be compared to confirm that various data elements match. For instance, the comparison may be used to determine that a payee matches, an amount matches, an account number matches, that identification presented to the associate matches expected identification or information, and the like. If data elements match, the instrument may be approved for transaction processing. At step 317, the transaction may be processed (e.g., the scanned instrument or check may be deposited).

Figure 4:
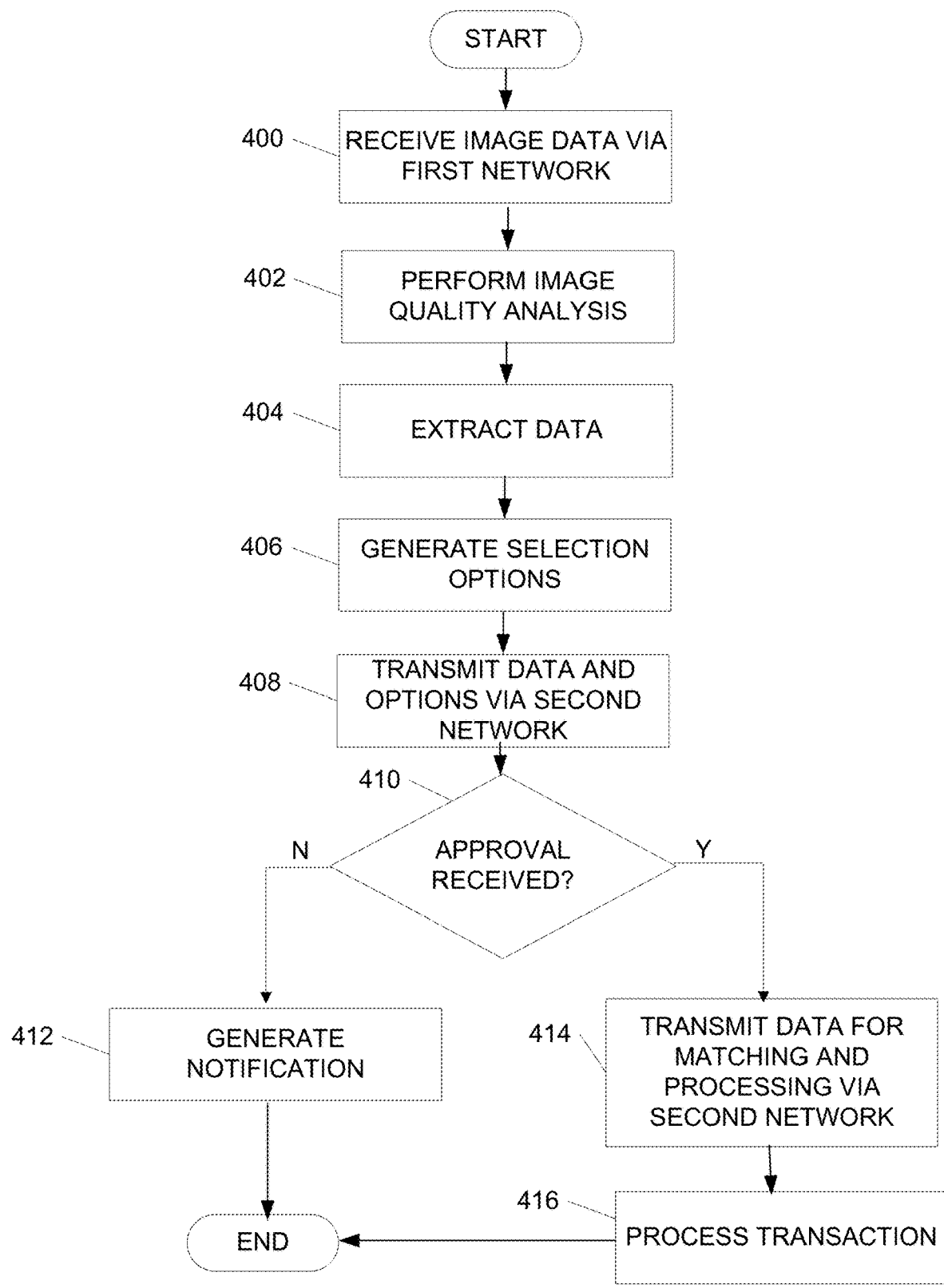
FIG. 4 depicts an illustrative method for implementing and using a system for image capture and recognition, according to one or more aspects described herein.

FIG. 4 is a flow chart illustrating one example method of providing image capture and recognition functions according to one or more aspects described herein. The processes illustrated in FIG. 4 are merely some example processes and functions. The steps shown may be performed in a different order, more steps may be added, or one or more steps may be omitted, without departing from the invention.

At step 400, image data, additional data, MICR line data, and the like, may be received by, for example, the image capture and recognition computing platform 110. In some examples, the image data, additional data, MICR line data, and the like may be received via a first network. For instance, as discussed herein, a scanning device 145 may be connected to a remote access computing platform 140 (e.g., via a wired connection) that may communicate with the image capture and recognition computing platform 110 via a first network. An instrument or image may be scanned using the scanning device 145 and image data, additional data, MICR line data, and the like may be transmitted from the remote access computing platform 140 to the image capture and recognition computing platform 110 via the first network.

At step 402, image quality analysis may be performed. For instance, image quality analysis such as determining whether the received image data is too light, too dark, indicates a physical issue with the scanned instrument or document, or the like, may be performed. In some examples, image quality analysis may include comparing data at identified pixel coordinates to expected data at the same coordinates to identify whether the image data is lighter than expected, darker than expected, physically deformed, or the like.

At step 404, data may be extracted from the image data. For instance, MICR line data may be read to obtain a check number, routing number, account number, or the like. In some examples, optical character recognition may be used to identify a payee, amount, date, determine whether the instrument or document was signed, endorsed, and the like.

At step 406, one or more options for selection may be generated and a user interface including the options may be generated. For instance, a user interface including options to rescan the instrument or document, remove the instrument or document from the transaction, or the like, may be generated.

At step 408, the image data, extracted data, and/or generated user interface may be transmitted to an associate computing device via a second network. As discussed herein, the second network may be different from the first network and at least some devices connected to the first network might not be connected to the second network, and vice versa.

At step 410, a determination may be made as to whether approval input has been received. For instance, after the image data and extracted data has been transmitted to the associate computing device 150, an associate may review the data and approve or reject it. If, at step 410, rejection input is received from the associate computing device 150, a notification may be generated at step 412 indicating that the transaction requested (e.g., depositing a check, or the like) has been denied. The notification may be displayed on the associate computing device 150 and, in some examples, may include additional options such as rescanning the document.

If, at step 410, approval input has been received, the image data and extracted data may be transmitted for matching and further processing at step 414. For instance, the image data and extracted data may be transmitted to a characteristic matching server 120 for evaluation against other data captured by, for instance, the associate computing device 150. If a match exists, the transaction may be processed at step 416.

Figure 5:
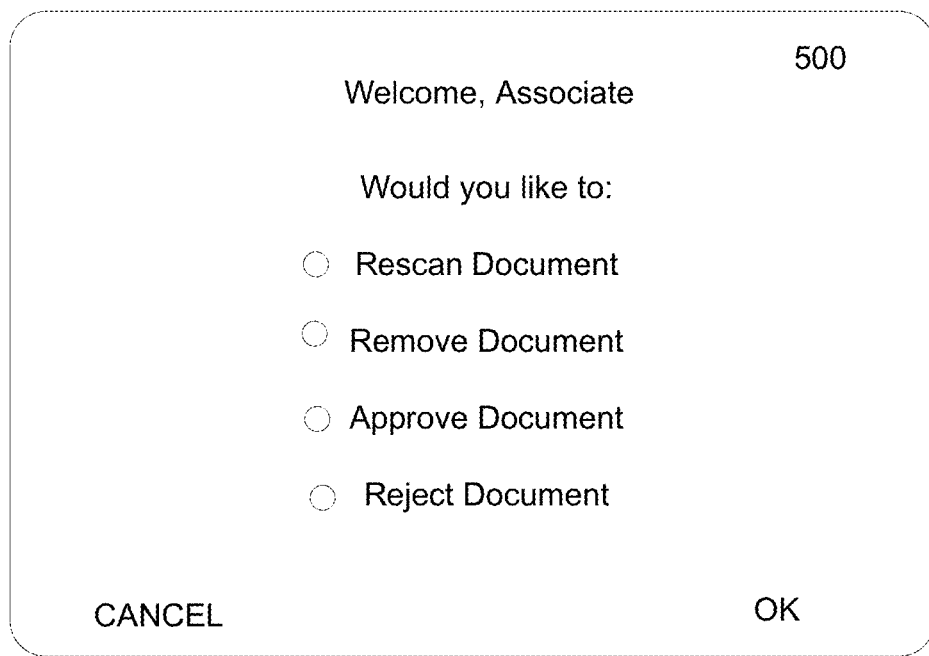
FIG. 5 illustrates one example user interface that may be used accordance with one or more aspects described herein.

FIG. 5 illustrates one example user interface 500 that may be generated and transmitted to the associate computing device 150. As shown in FIG. 5, the interface 500 includes various options available for selection by an associate operating an associate computing device 150. For instance, the associate may select options to rescan a document, remove a document from the transaction, approve the document, reject the document, and the like. In some examples, additional options may be provided in addition to or in lieu of one or more of the options shown (e.g., view document, or the like).

Aspects described herein relate to controlling scanning device functionality, as well as image capture and recognition functions. As discussed herein, the arrangements described allow for control of scanning device and image capture and recognition across multiple networks to maintain data security, conform to regulations, and the like.

Although aspects described herein are described in the context of using two private networks, in some examples, aspects described herein may be performed using a single private network. For instance, in some examples, all devices may be connected to, for example, a first private network. However, in some arrangements, one or more devices may be prevented from communicating with one or more other devices via the network. Accordingly, data transmitted may be transmitted as discussed herein but via a single network.

In one example, the arrangements described herein may be used in a financial institution, such as a banking center or branch. As customers are assisted by a banking associate or teller, the customers expect to be provided efficient service and have transactions processed quickly and efficiently.

In some arrangements, a computing device of the associate or teller might not be connected to a same network as a scanning device, such as a check scanning device arranged at the banking associate's work station. Thus, when a customer requests to deposit one or more checks, the teller cannot efficiently scan the checks, view check data and/or verification or validity data, and the like, in order to process the requested check deposit. In arrangements describes herein, the user may request check scanning initiation by transmitting a request from the associate computing device, via a second network, to the image capture and recognition computing platform.

The image capture and computing platform may receive the request and may generate and transmit an instruction to initiate scanning. The instruction may be transmitted via a first network and may be transmitted to a remote access computing platform that unidirectionally controls the scanning device at, for example, the banking associate's workstation. The scanning device may be activated and one or checks for which deposit has been requested may be scanned. In some examples, the checks may be physically moved through the scanning device in order to scan the checks.

After the one or more checks have been scanned, the image data may be transmitted, via the first network, from the remote access computing platform to the image capture and recognition computing platform. The image capture and computing platform may analyze the image data, extract data, and the like, as discussed herein. The image data and extracted data may be transmitted to the associate computing device via the second network where the associate may view the data, initiate rescanning, view the document, or the like. If the associate verifies the information and approves deposit, user input indicating approval may be transmitted from the associate computing device to the image capture and recognition computing platform. Additional processing and final transaction processing may then be facilitated by the image capture computing platform and associate computing device in conjunction with one or more other devices, as discussed herein.

Accordingly, the arrangements described herein may be performed in real-time (e.g., as a customer is working with the banking associate to facilitate deposit of the checks) in order to efficiently scan the checks and complete the deposit transaction. In addition, aspects described herein may be performed as individual transactions of one or more checks (e.g., each deposit of one or more checks may be scanned, processed, and the like). Additionally or alternatively, the processes described herein could be a batch process.

The above-described examples and arrangements are merely some example arrangements in which the systems described herein may be used. Various other arrangements employing aspects described herein may be used without departing from the invention.

Figure 6:
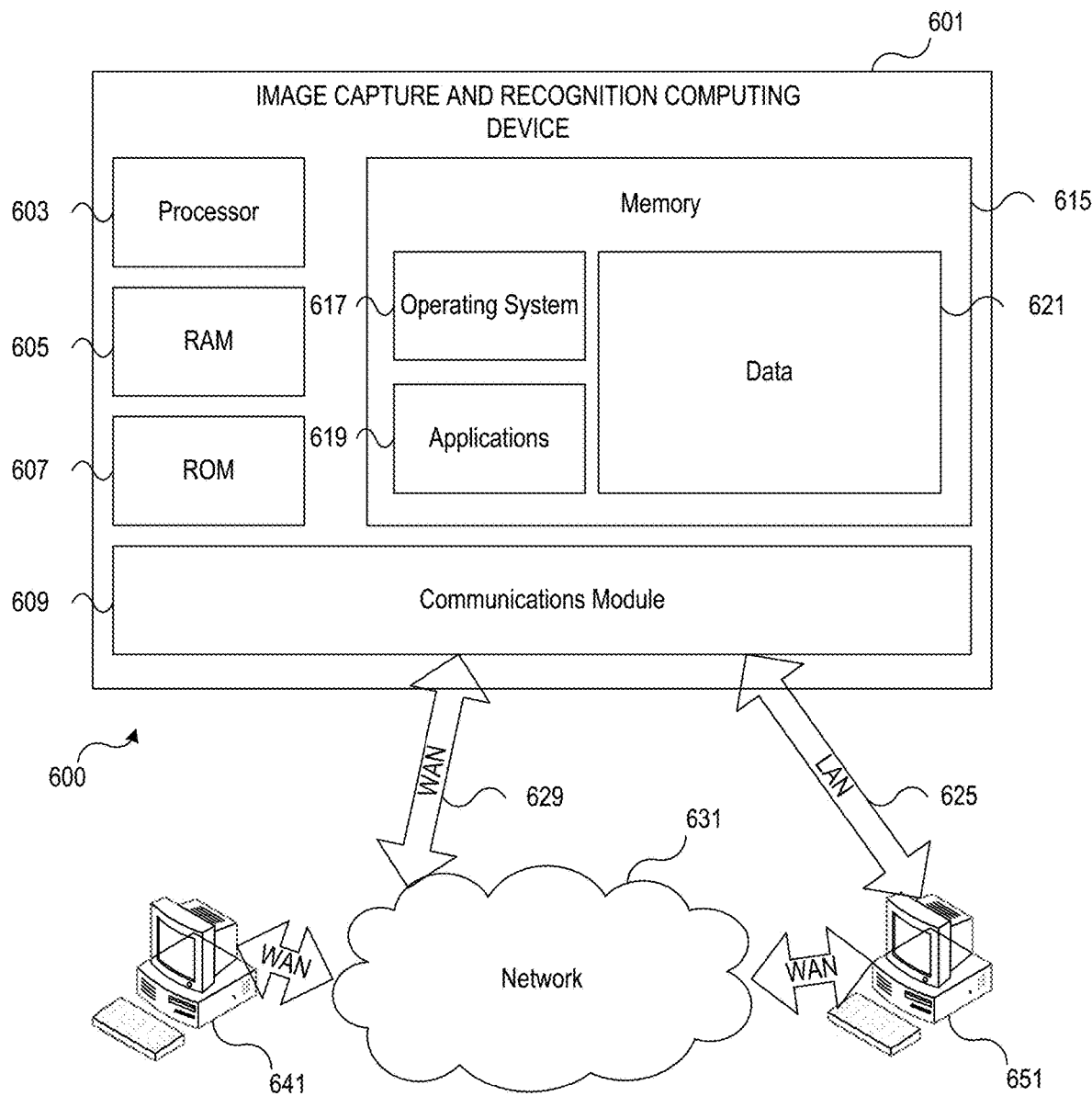
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments.

Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include image capture and recognition computing device 601 having processor 603 for controlling overall operation of image capture and recognition computing device 601 and its associated components, including Random Access Memory (RAM) 605, Read-Only Memory (ROM) 607, communications module 609, and memory 615. Image capture and recognition computing device 601 may include a variety of computer readable media. Computer readable media may be any available media that may be accessed by image capture and recognition computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on image capture and recognition computing device 601. Such a processor may execute computer-executable instructions stored on a computer-readable medium.

Software may be stored within memory 615 and/or storage to provide instructions to processor 603 for enabling image capture and recognition computing device 601 to perform various functions as discussed herein. For example, memory 615 may store software used by image capture and recognition computing device 601, such as operating system 617, application programs 619, and associated database 621. Also, some or all of the computer executable instructions for image capture and recognition computing device 601 may be embodied in hardware or firmware. Although not shown, RAM 605 may include one or more applications representing the application data stored in RAM 605 while image capture and recognition computing device 601 is on and corresponding software applications (e.g., software tasks) are running on image capture and recognition computing device 601.

Communications module 609 may include a microphone, keypad, touch screen, and/or stylus through which a user of image capture and recognition computing device 601 may provide input, and may also include one or more of a speaker for providing audio output and a video display device for providing textual, audiovisual and/or graphical output. Computing system environment 600 may also include optical scanners (not shown).

Image capture and recognition computing device 601 may operate in a networked environment supporting connections to one or more remote computing devices, such as computing devices 641 and 651. Computing devices 641 and 651 may be personal computing devices or servers that include any or all of the elements described above relative to image capture and recognition computing device 601.

The network connections depicted in FIG. 6 may include Local Area Network (LAN) 625 and Wide Area Network (WAN) 629, as well as other networks. When used in a LAN networking environment, image capture and recognition computing device 601 may be connected to LAN 625 through a network interface or adapter in communications module 609. When used in a WAN networking environment, image capture and recognition computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
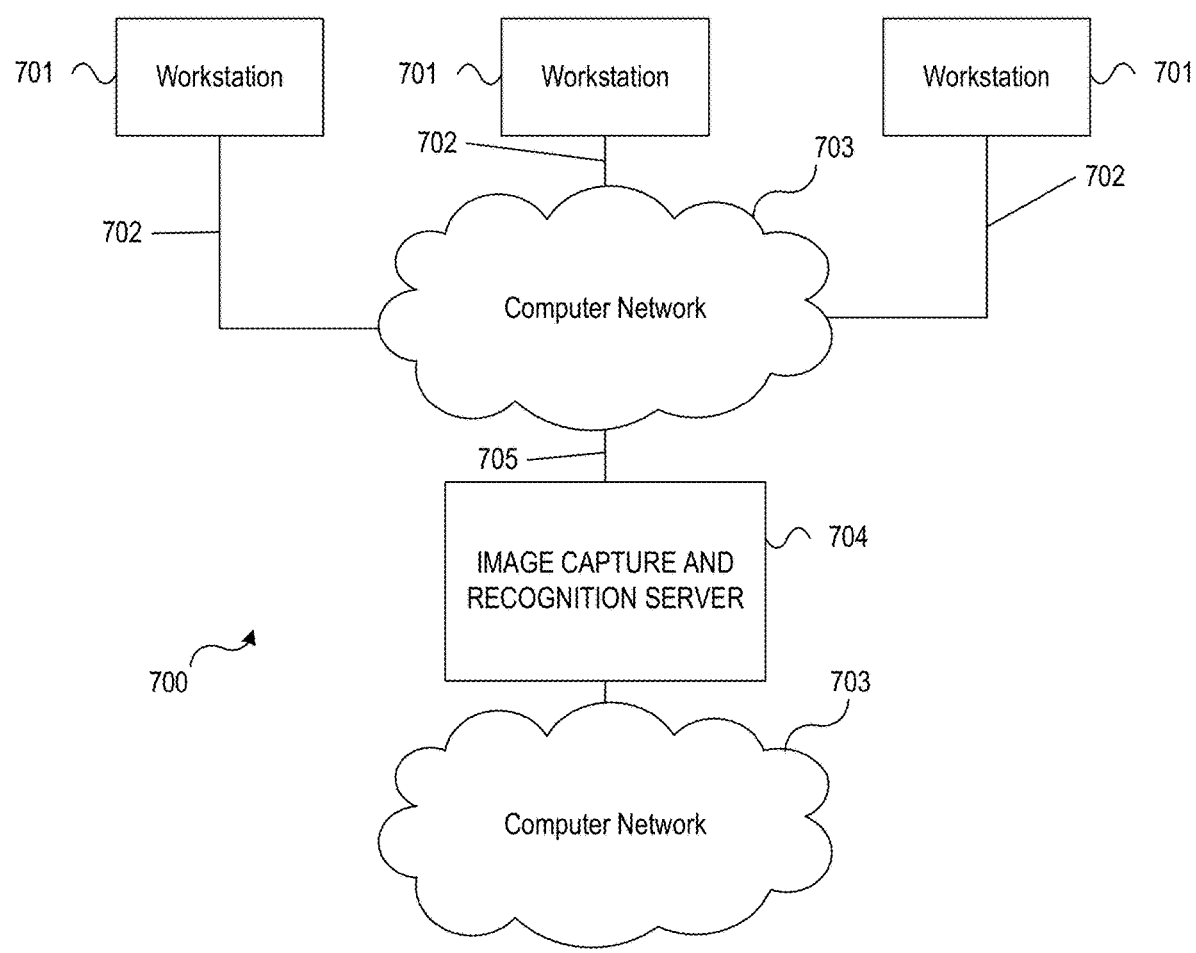
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to image capture and recognition server 704. In system 700, image capture and recognition server 704 may be a server, processor, computer, or data processing device, or combination of the same, configured to perform the functions and/or processes described herein. Server 704 may be used to receive requests to initiate scanning, transmit requests, receive image data, analyze image data, cause approval of transactions, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and image capture and recognition server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and memory storing computer-readable instructions that, when executed by the at least one processor, cause the computing platform to:

receive, via a first private network of a financial institution and from a driverless scanning device unidirectionally controlled by a second, different computing platform, image data of a scanned document;

analyze the received image data to perform image quality analysis;

extract, from the image data, a plurality of data elements;

transmit, via a second, different private network of the financial institution, the image data and extracted data elements;

receive, via the second private network, approval response data indicating that the image data is approved and the scanned document is approved for further processing; and transmit, via the second private network, the image data and extracted data for further processing.

2. The computing platform of claim 1, wherein the second, different computing platform is in communication with the computing platform via the first network.

3. The computing platform of claim 1, wherein the image quality analysis includes determining whether the image data is too light, too dark or indicates a physical deformity in the scanned document.

4. The computing platform of claim 1, wherein the plurality of data elements includes at least two of: a payee, an amount, a determination of whether the document was signed and a determination of whether the document was endorsed.

5. The computing platform of claim 1, wherein the plurality of data elements is extracted using optical character recognition.

6. The computing platform of claim 1, wherein the scanned document includes a magnetic ink character recognition (MICR) line.

7. The computing platform of claim 6, wherein at least one data element of the plurality of data elements is extracted by reading the MICR line.

8. The computing platform of claim 1, further including instructions that, when executed, cause the computing platform to:

analyze the plurality of data elements to determine a validity score for the scanned document.

9. The computing platform of claim 1, wherein the computing platform does not communicate directly with the driverless scanning device.

10. The computing platform of claim 1, wherein the image data of the scanned document is generated by physically moving a document through the driverless scanning device.

11. A method, comprising:

by a computing platform comprising at least one processor, memory, and a communication interface:

receiving, by the at least one processor, via a first private network of a financial institution and from a driverless scanning device unidirectionally controlled by a second, different computing platform, image data of a scanned document;

analyzing, by the at least one processor, the received image data to perform image quality analysis;

extracting, by the at least one processor and from the image data, a plurality of data elements;

transmitting, by the at least one processor and via a second, different private network of the financial institution, the image data and extracted data elements;

receiving, by the at least one processor and via the second private network, approval response data indicating that the image data is approved and the scanned document is approved for further processing; and transmitting, by the at least one processor and via the second private network, the image data and extracted data for further processing.

12. The method of claim 11, wherein the image quality analysis includes determining whether the image data is too light, too dark or indicates a physical deformity in the scanned document.

13. The method of claim 11, wherein the plurality of data elements includes at least two of: a payee, an amount, a determination of whether the document was signed and a determination of whether the document was endorsed.

14. The method of claim 11, wherein the plurality of data elements is extracted using optical character recognition.

15. The method of claim 11, wherein the scanned document includes a magnetic ink character recognition (MICR) line.

16. The method of claim 15, wherein at least one data element of the plurality of data elements is extracted by reading the MICR line.

17. One or more non-transitory computer-readable media storing instructions that, when executed by a computing platform comprising at least one processor, memory, and a communication interface, cause the computing platform to:

receive, via a first private network of a financial institution and from a driverless scanning device unidirectionally controlled by a second, different computing platform, image data of a scanned document;

analyze the received image data to perform image quality analysis;

extract, from the image data, a plurality of data elements;

transmit, via a second, different private network of the financial institution, the image data and extracted data elements;

receive, via the second private network, approval response data indicating that the image data is approved and the scanned document is approved for further processing; and transmit, via the second private network, the image data and extracted data for further processing.

18. The one or more non-transitory computer-readable media of claim 17, wherein the second, different computing platform is in communication with the computing platform via the first network.

19. The one or more non-transitory computer-readable media of claim 17, wherein the image quality analysis includes determining whether the image data is too light, too dark or indicates a physical deformity in the scanned document.

20. The one or more non-transitory computer-readable media of claim 17, wherein the plurality of data elements includes at least two of: a payee, an amount, a determination of whether the document was signed and a determination of whether the document was endorsed.

21. The one or more non-transitory computer-readable media of claim 17, wherein the plurality of data elements is extracted using optical character recognition.

22. The one or more non-transitory computer-readable media of claim 17, wherein the scanned document includes a magnetic ink character recognition (MICR) line and wherein at least one data element of the plurality of data elements is extracted by reading the MICR line.

\* \* \* \* \*